Figure 1:
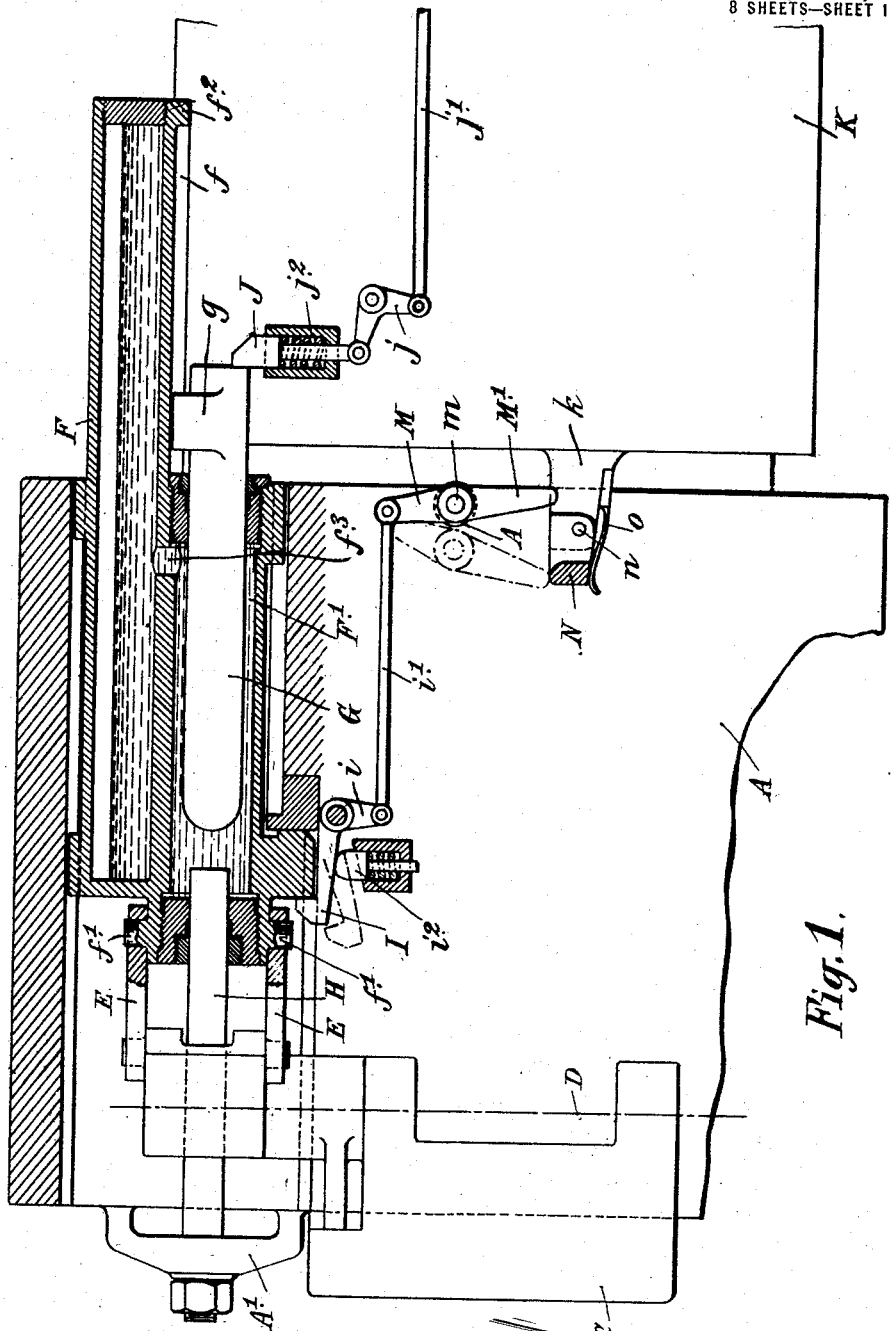

E. SCHNEIDER.
APPARATUS FOR THE SEMI-AUTOMATIC WORKING OF THE BREECH MECHANISM OF GUNS OF LARGE CALIBER.
APPLICATION FILED JULY 8, 1915.

1,172,490.

Patented Feb. 22, 1916.
8 SHEETS—SHEET 1.

E. SCHNEIDER.
APPARATUS FOR THE SEMI-AUTOMATIC WORKING OF THE BREECH MECHANISM OF GUNS OF LARGE CALIBER.
APPLICATION FILED JULY 8, 1915.

1,172,490.

Patented Feb. 22, 1916.
8 SHEETS—SHEET 2.

E. SCHNEIDER.
APPARATUS FOR THE SEMI-AUTOMATIC WORKING OF THE BREECH MECHANISM OF GUNS OF LARGE CALIBER.
APPLICATION FILED JULY 8, 1915.

1,172,490. Patented Feb. 22, 1916.
8 SHEETS—SHEET 4.

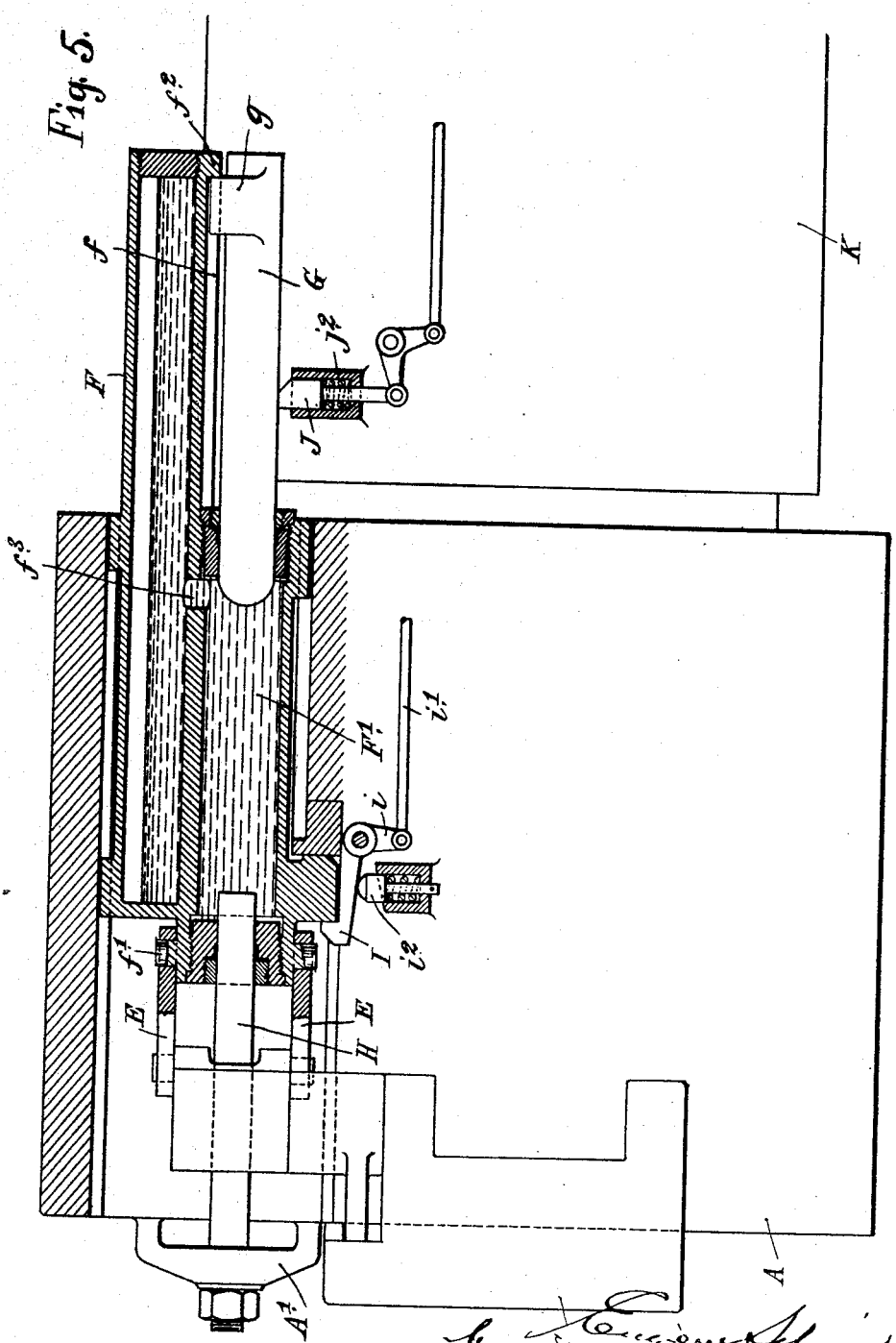

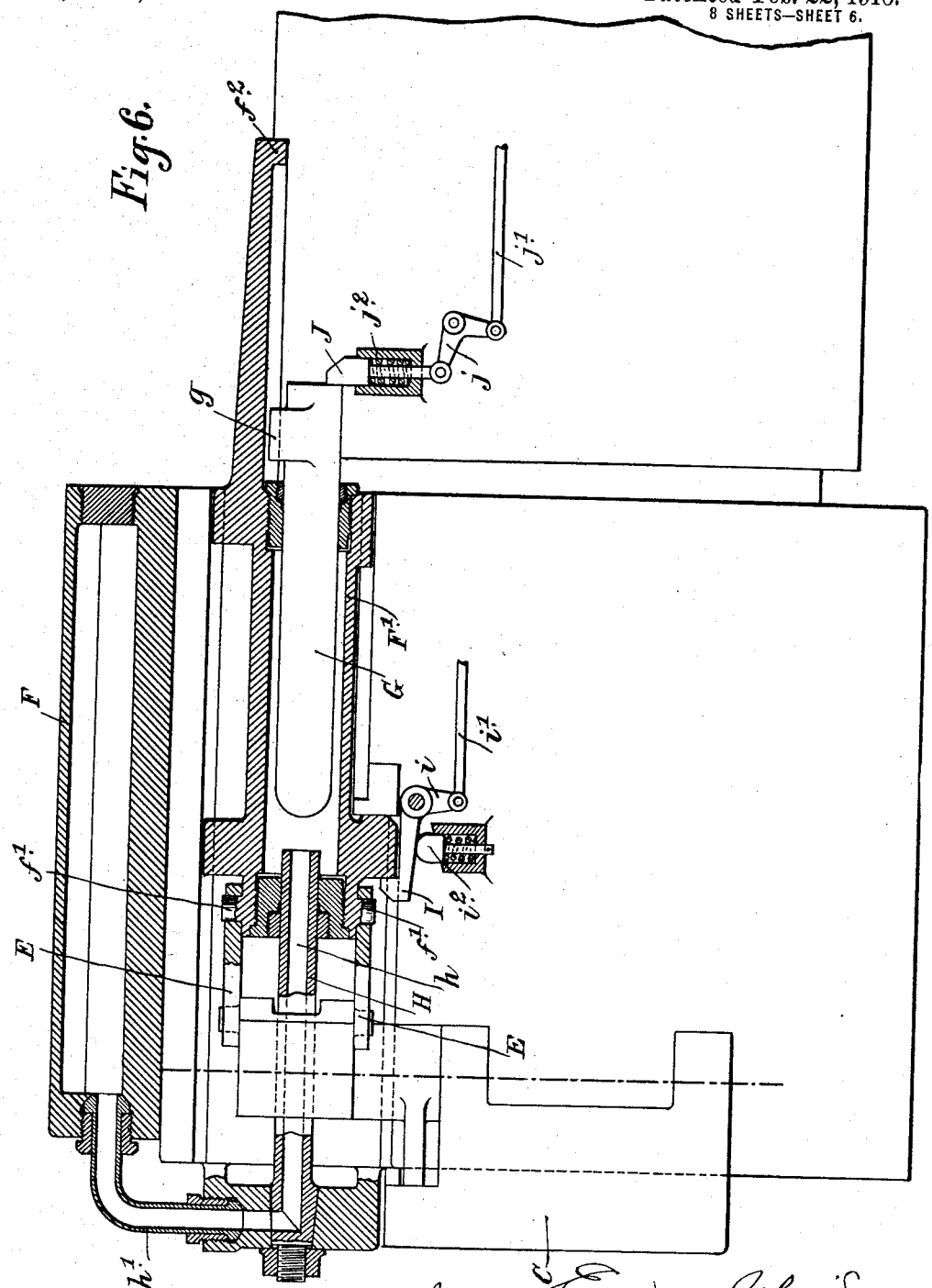

E. SCHNEIDER.
APPARATUS FOR THE SEMI-AUTOMATIC WORKING OF THE BREECH MECHANISM OF GUNS OF LARGE CALIBER.
APPLICATION FILED JULY 8, 1915.
1,172,490.
Patented Feb. 22, 1916.
8 SHEETS—SHEET 7.
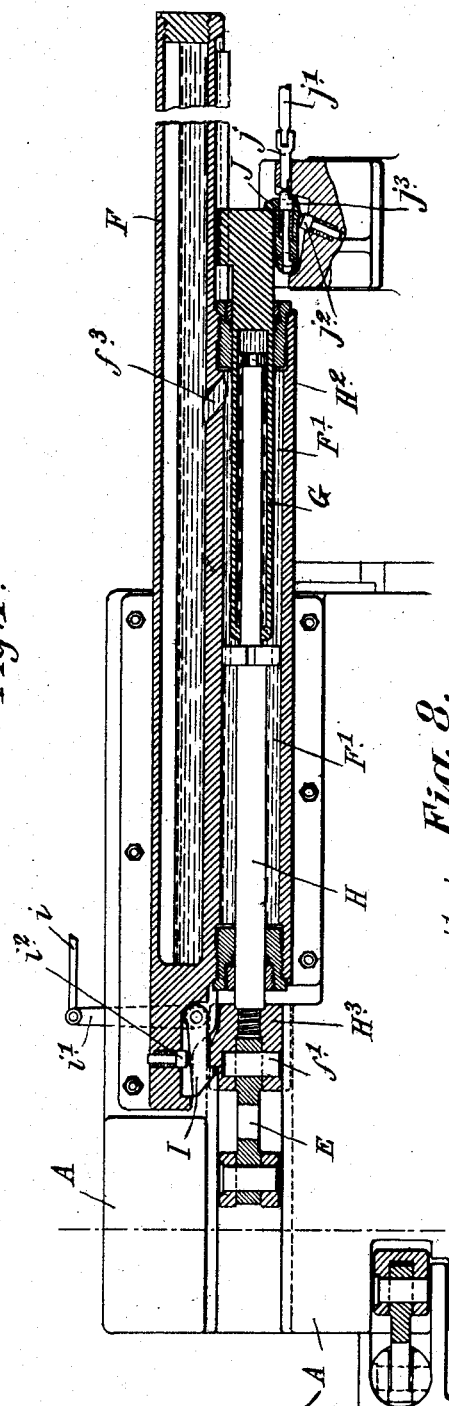
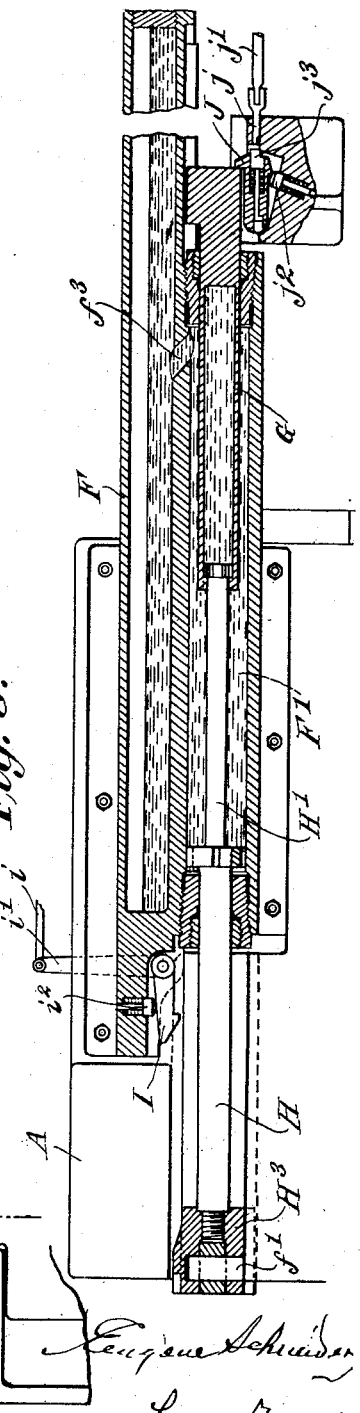

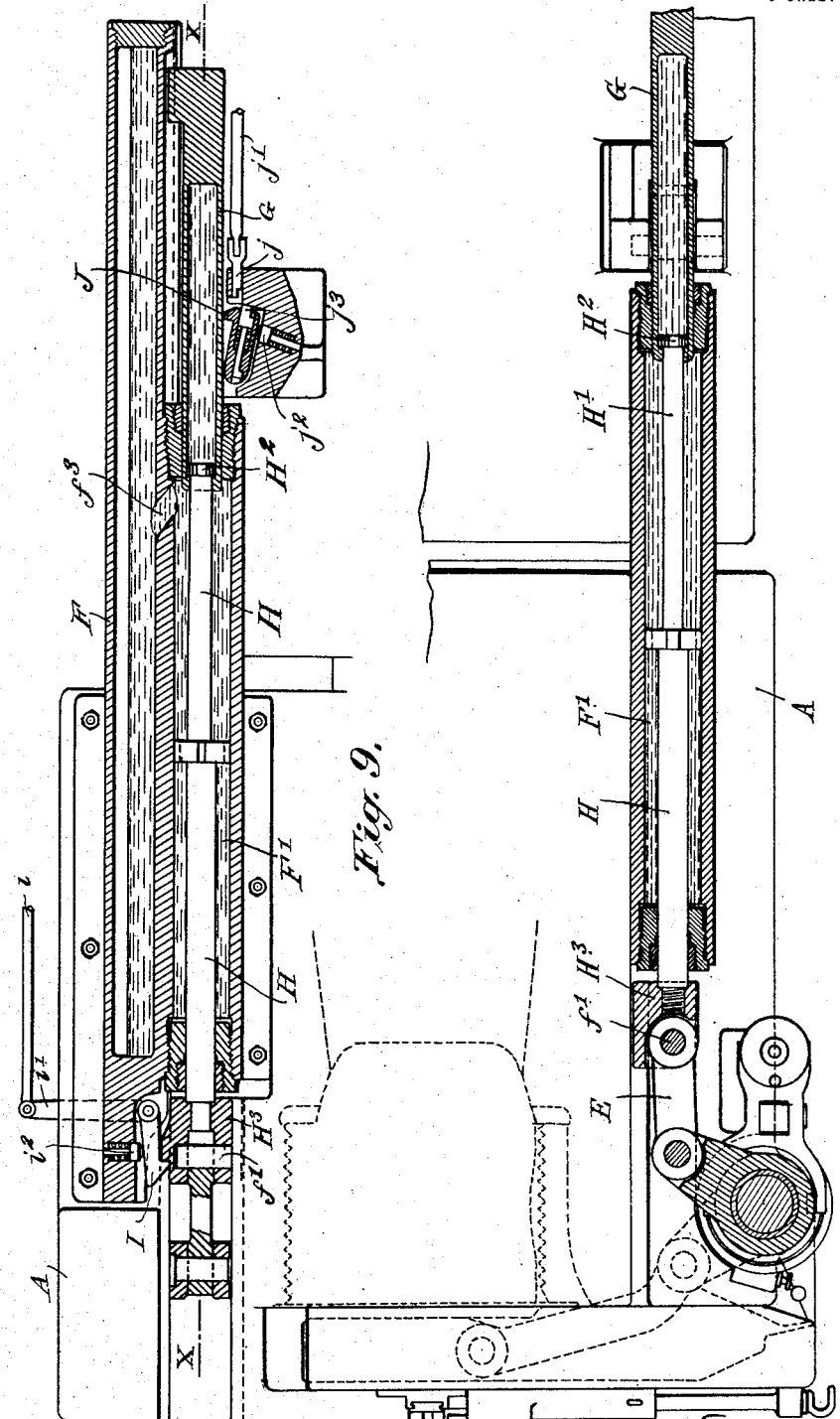

UNITED STATES PATENT OFFICE.

EUGÈNE SCHNEIDER, OF PARIS, FRANCE.

APPARATUS FOR THE SEMI-AUTOMATIC WORKING OF THE BREECH MECHANISM OF GUNS OF LARGE CALIBER.

1,172,490.

Specification of Letters Patent.

Patented Feb. 22, 1916.

Application filed July 8, 1915. Serial No. 38,740.

*To all whom it may concern:*

Be it known that I, EUGÈNE SCHNEIDER, a citizen of the Republic of France, residing at Paris, France, have invented a new and useful Apparatus for the Semi-Automatic Working of the Breech Mechanism of Guns of Large Caliber, which is fully set forth in the following specification.

The present invention has for object an apparatus for the semi-automatic working of the breech mechanism of guns of large caliber, by means of the energy derived from a hydro-pneumatic recoil brake.

The new apparatus is characterized by the fact that the operations are obtained, without the aid of a distributer, by the relative movements between a chamber for liquid of the recoil brake and two plungers of different diameters working in this chamber, these movements being effected by the simple retirement of stops against which one of the members (the brake or the plungers) or the two others alternately bear, the working of the breech mechanism being effected it being understood by a gearing of a suitable nature connected to the recoil brake or to one of the plungers.

With the new apparatus, all the operations are effected in short by the relative movement between the recoil brake constantly under pressure and two plungers which are always engaged therein; only simple variations of pressure are consequently produced in the recoil brake, and the working does not require any distributer, neither any auxiliary reservoir from which a portion of the liquid is evacuated to be returned thereto on the recoil. Finally, no safety device is necessary in case of non-opening of the breech, since the accidental or intentional non-working of the breech only results in no relative movement of the liquid chamber with relation to that of the plungers which would have had to move which has no other effect than that of maintaining the pressure in the recoil brake.

Various constructional forms of the invention are represented by way of example in the accompanying drawing.

Figure 2:
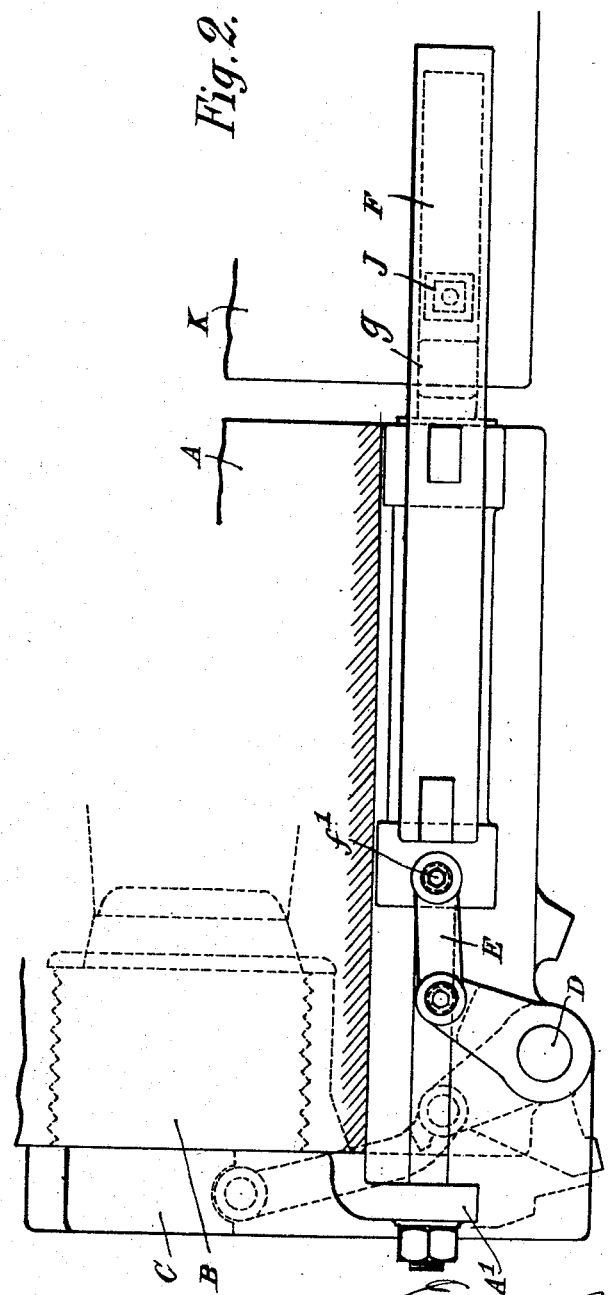
Figure 3:
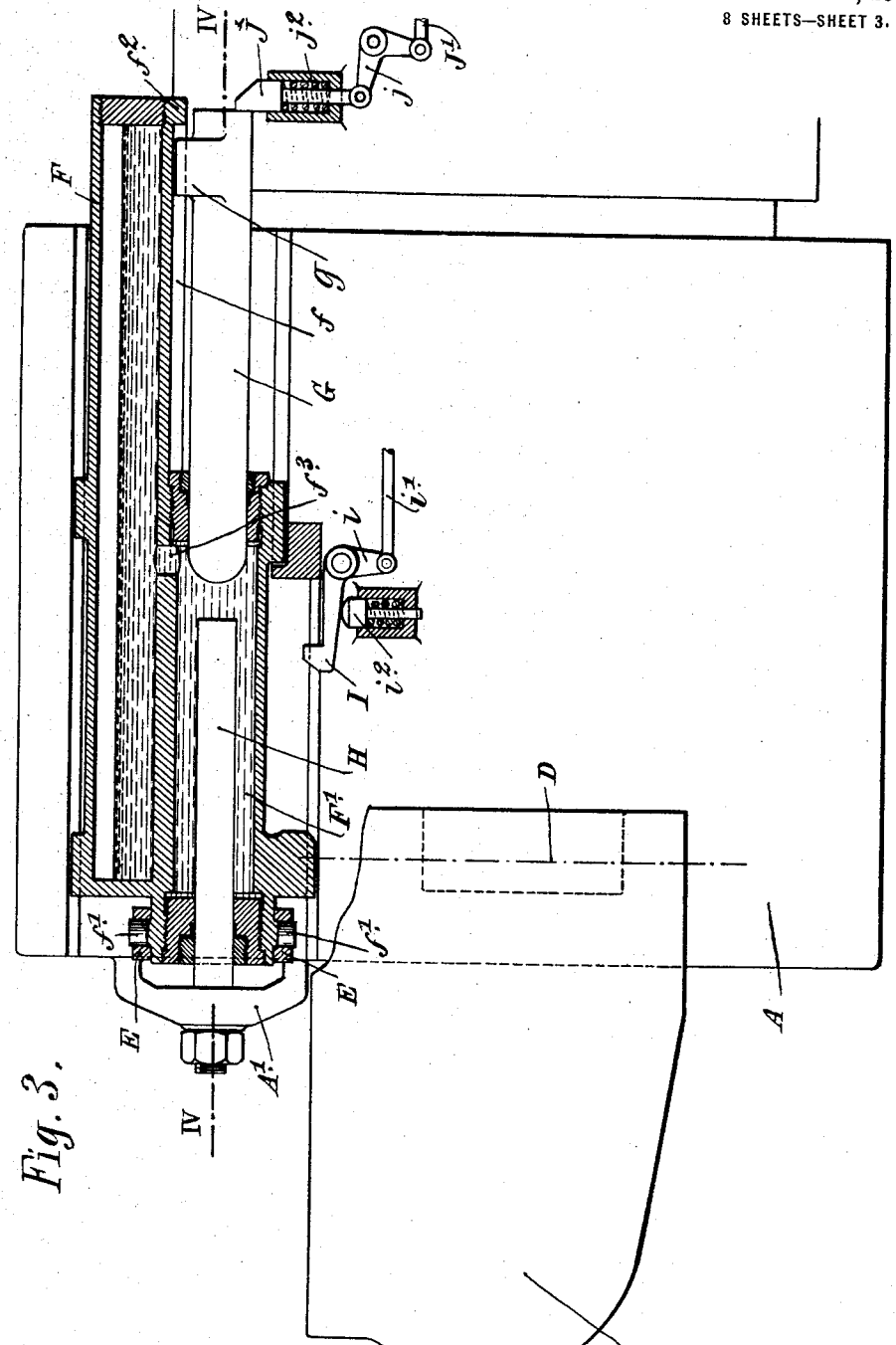
Figure 4:
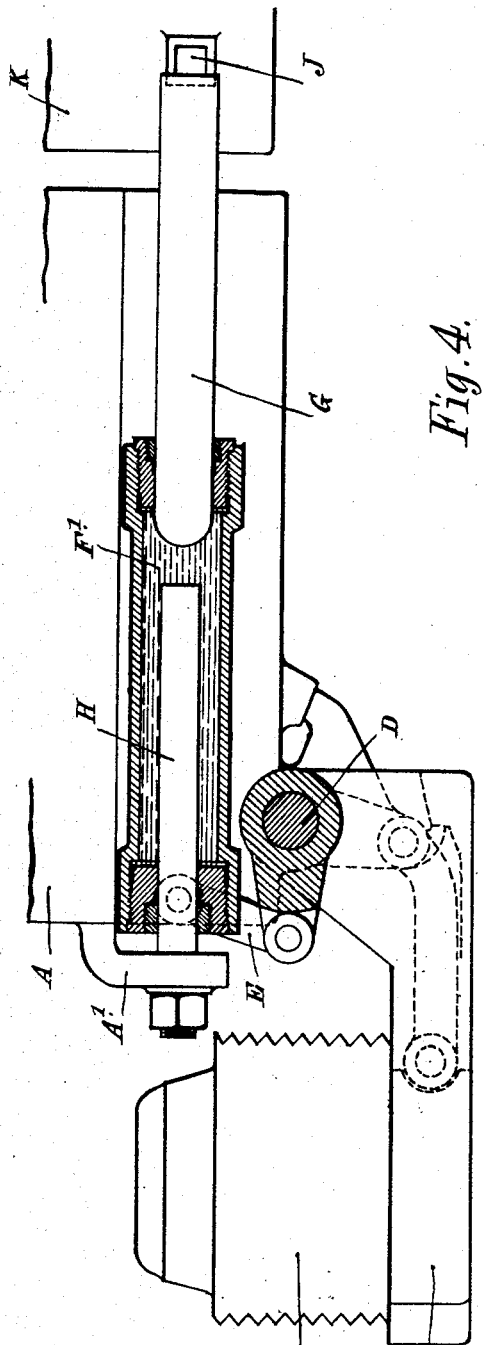

Figure 1 is a sectional elevation of one embodiment of the invention taken along the axis of the recoil brake and the liquid chamber of this latter in which are mounted the two plungers; the parts are shown in the position which they occupy when the breech mechanism is closed, at the end of the running out movement of the gun and before it is loaded. Fig. 2 is a corresponding plan view, showing more particularly the connection of the apparatus by means of an appropriate gearing to the breech mechanism to be worked. Fig. 3 is a section similar to that of Fig. 1, showing the parts in the position which they occupy when the breech mechanism is open. Fig. 4 is a sectional plan on the line IV—IV of Fig. 3. Fig. 5 is a sectional elevation showing the parts in the position which they occupy when the gun is loaded and the breech mechanism closed. Fig. 6 shows in sectional elevation another embodiment of the invention similar in many respects to the embodiment shown in Figs. 1 to 5. The parts are represented in the position which they occupy when the gun is run out after firing and before a fresh loading has been effected. Fig. 7 is a sectional elevation of still another embodiment of the invention showing the parts in the position which they occupy when the gun is run out and before being loaded. Fig. 8 is a similar section showing the parts in the position which they occupy when the breech mechanism is open. Fig. 9 shows, in another similar section, the breech mechanism closed after the gun has been loaded. Fig. 10 is a sectional plan on the line X—X of Fig. 9.

In Figs. 1 to 5, A denotes the rear end of the gun, B is the breech block, which, in the example illustrated, is supposed to be of the screw type and carried by a carrier C movable about a hinge spindle D.

The gearing which works the block B and the carrier C, which does not form any part of this invention and may be of various constructional forms, has, as its connecting member with the new operating device, a double connecting rod E—E.

The operating device proper comprises according to this invention, the three following principal elements:—a hydro-pneumatic recoil brake F—F′, into a liquid chamber of which extend two plungers G, H preferably of different diameters. In this first constructional form the gearing for working the breech block and the carrier is connected to the recoil brake F—F', which is slidably mounted preferably on the reciprocable part of the gun. In the present case the connecting rods E are connected to trunnions $f'$ projecting from the end of the liquid chamber F'. The plunger H, of smaller diameter, has its outer end fixed to a stirrup A' connected to the gun A. The plunger G, of larger diameter, working freely in the chamber F' is provided externally with a lug $g$ for which a stop $f^2$ is mounted on the front end of the cylinder F, at the bottom of a guide groove $f$ made in the wall of the said cylinder. As will be seen hereinafter, the stop $f^2$ serves alternately as an arresting and driving device in the relative movements of the plunger G.

The apparatus is completed by two movable stops adapted to be worked by hand. One of these stops I placed behind the recoil brake is mounted on the gun A; the recoil brake bears against it in the position when the breech mechanism is closed; the other stop J is placed upon the cheek of the gun cradle K, that is to say upon a part which does not recoil, and the front edge of plunger G bears against it, when in the position which it occupies when the breech is closed, at the end of the running out movement and before the gun is loaded.

When the breech mechanism is closed and when the gun is run out but not loaded, the parts occupy finally the position shown in Figs. 1 and 2. The plunger G is inserted to the maximum in the liquid chamber F'; the plunger H, on the contrary occupies the position of extreme emergence with relation to F'.

To load the gun the breech is opened. To this end the stop I is drawn back by acting upon the gearing $i$—$i'$ and compressing the spring buffer $i^2$. F—F' is set free, G remains supported against J. The liquid in the cylinder F' constantly reacts against the pistons G and H, and the total reactive pressure which is exerted upon G being, owing to the difference of the diameters, greater than that which is exerted upon H, F—F' moves toward the rear under the influence of the reaction, taking with it by the trunnions $f'$, the gearing for working the breech mechanism, and thus producing in succession in the well known way the unscrewing of the breech block B, followed by the turning of the carrier C which brings the parts into the position shown in Figs. 3 and 4. The fixed plunger H is then engaged to the maximum in the chamber F', while G is on the contrary in its position of extreme emergence. Once the loading of the gun has been carried out, the breech mechanism is closed. To this end the stop J is drawn back, by acting upon the gearing $j$—$j'$ and compressing the supporting spring $j^2$. The pressure of the liquid exerted on the plunger G, which has now become free, has the effect of first driving the plunger forward, until the lug $g$ strikes against $f^2$. Then G being locked against $f^2$, the reactive pressure of the liquid is effectively exerted entirely upon H which is fixed, and drives forward the whole of F—F' and G, the parts finally occupying the position of Fig. 5. In this movement the trunnions $f'$ have operated the gearing which works the breech block and produced turning of the carrier C followed by the screwing home of the breech block into its nut. At the end of the movement, the stop I is raised automatically by the action of the spring buffer $i$. When the gun recoils on firing, the recoil brake F—F' taking part in the recoil, carries with it by the action of the stop $f^2$ on the lug $g$, the plunger G. As soon as the front edge of the said plunger G has drawn back sufficiently to pass over the movable stop J, this latter rises under the action of its spring $j^2$ and resumes the position of Fig. 1, the three parts F—F', H and G preserving the same relative positions as in Fig. 5. When the gun runs out, as G strikes against J, the two parts F—F' and H move relatively to G which passes into the chamber F', thus causing a corresponding volume of liquid to flow from F' into F through the orifice $f^3$. The parts then resume the position indicated in Fig. 1. The apparatus is then ready for a fresh loading.

In the construction shown in Fig. 6 the liquid chamber F' of the recoil brake F—F' is alone movable with relation to the fixed plunger H. The communication between the recoil brake proper F and the movable chamber F' is established here by the medium of the plunger H pierced with an axial passage $h$, which communicates with the bottom of the chamber F by a passage $h'$. In other respects the apparatus is identical with that of the preceding example. The working thereof is also the same, with this difference merely that the circulation of the liquid between F and F' is effected by the passages $h$ and $h'$. This constructional form may present the advantage of permitting the working of the mechanism with less movement of the inert masses, seeing that the chamber F is always connected to the gun and has no need to be driven by the connecting devices $f$—$f'$ and others between the recoil brake and the breech. Furthermore, as F is connected to the recoiling part, the usual running out gear may be used as an accumulator for working the breech mechanism.

In the construction shown in Figs. 7 to 10 the breech instead of being connected to the liquid chamber F', is connected by the operating gearing (i. e. the trunnion f' and the connecting rod E) to the plunger H. The recoil brake F—F' is fixed upon the gun. The plunger H has an extension H', which by means of a head H² notched at intervals on its periphery, engages in the plunger G which is hollow for the greater part of its length.

The movable stop I serves as a support to an outer head H³ of the plunger H. If the stop I be drawn back by working the gearing i—i' and compressing the spring buffer i², the plunger H is released. The pressure of the liquid exerted on the total section of this plunger drives it back out of the chamber F' thereby producing the opening of the breech mechanism. The parts assume the position shown in Fig. 8. To close the breech after the gun has been loaded, the stop J is drawn back by pushing the spring buffer j³. J rocks under the pressure which the liquid exerts on G. G moves forward and strikes with its inner end against the head H² of the plunger H—H'. H—H'—H² is then driven forward by G, and the breech mechanism is closed; the movable stop I hooking itself behind the head H³. The parts assume the position indicated in Fig. 9. When the gun is fired and under the action of the recoil, the whole, F—F', G, H²—H'—H moves toward the rear. Immediately, the front edge of G has passed over the nose of the stop J, this latter rises under the action of the spring buffer j². When the gun runs out, G is held at the front against J and enters into the liquid chamber F'. The parts reassume at the end of the running out movement, the position of Fig. 7.

It is easy to understand that in all the constructional forms the drawing back of the stop I might have been effected automatically, when the gun runs out, by the encounter of one of the components i' of the gearing and a fixed point on the gun carriage cheek K. This is shown by way of example in Fig. 1.

A rock lever M—M' is pivoted at m to the gun and connected by the arm M to the connecting rod i'. When the gun runs out the inner end of M' comes into contact (see the position shown by dot and dash lines) with a tappet N, subjected to the action of a spring O and pivoted at n to a support k fixed to the cheek K of the gun carriage. While the gun is being run out, the rock lever as soon as M' strikes against N, rocks about m and pulls on i' to draw back I. At the end of the running out movement, the rock lever occupies the position shown by full lines. At the commencement of the recoil, M' meets the tappet N and displaces it. N then resumes its position under the action of the spring O.

What I claim and desire to secure by Letters Patent of the United States is:—

1. In a gun, the combination of a cylinder containing fluid under pressure, two independent pistons in the cylinder, and means dependent on relative movements between the pistons and the cylinder for opening and closing the breech.

2. In a gun, the combination of a cylinder containing fluid under pressure, two independent pistons in the cylinder, and means dependent on relative movement between one piston and the cylinder for opening the breech and dependent on relative movement between the other piston and the cylinder for closing the breech.

3. In a gun, the combination of a cylinder containing fluid under pressure, two independent differently diametered pistons in the cylinder, and means dependent on relative movement between one piston and the cylinder for opening the breech and dependent on relative movement between the other piston and the cylinder for closing the breech.

4. In a gun, the combination of a cylinder containing fluid under pressure, two independent pistons in the cylinder, breech opening-and-closing mechanism, and means dependent on relative movement between both pistons and the cylinder for moving the mechanism in one direction and dependent on relative movement between the one piston and the cylinder and other piston for moving the mechanism in the other direction.

5. In a gun, the combination of a cylinder containing fluid under pressure, two independent differently diametered pistons in the cylinder, breech opening-and-closing mechanism, and means dependent on relative movement between both pistons and the cylinder for moving the mechanism in one direction and dependent on relative movement between the smaller piston and the cylinder and larger piston for moving the mechanism in the other direction.

6. In a gun, the combination of a cylinder containing fluid under pressure, mechanism operable by the said pressure for opening and closing the breech, and independently releasable stops for preventing the movement of the said mechanism in the opening and closing directions respectively.

7. In a gun, the combination of a cylinder containing fluid under pressure, two independent pistons in the cylinder, a breech opening-and-closing means operatively associated with the said cylinder and pistons to be operated by the fluid pressure in the cylinder, and independently releasable stops for preventing the movement of the said mechanism in the opening and closing directions respectively.

8. In a gun, the combination of a cylinder containing fluid under pressure, two independent pistons in the cylinder, breech opening-and-closing mechanism, a releasable device for preventing relative movement between the cylinder and one piston, a releasable device for locking the other piston against movement, and means operative upon the release of the first device for moving the said mechanism in one direction and operative upon the release of the second device for moving the said mechanism in the other direction.

9. In a recoil gun having a reciprocable part and a non-reciprocable part, the combination of a cylinder containing fluid under pressure, a piston in the cylinder, mechanism dependent on relative movements between the cylinder and the piston under the influence of the fluid pressure for moving the breech block, and means dependent on the relative movement of the two parts of the gun and operative while the breech block moving mechanism is idle for restoring the said cylinder and piston to their initial relative positions.

10. In a recoil gun having a reciprocable part and a non-reciprocable part, the combination of a cylinder containing fluid under pressure, two independent pistons in the cylinder, mechanism dependent on relative movements between the cylinder and the pistons under the influence of the fluid pressure for opening and closing the breech, and means dependent on the relative movement of the two parts of the gun and operative while the opening-and-closing mechanism is idle for restoring the said cylinder and pistons to their initial relative positions.

11. In a recoil gun having a reciprocable part and a non-reciprocable part, the combination of a cylinder carried by the reciprocable part and containing fluid under pressure, two independent pistons in the cylinder, breech opening-and-closing mechanism, a releasable stop on the reciprocable part for preventing relative movement between the cylinder and one piston, a releasable stop on the non-reciprocable part for locking the other piston against movement, and means operative upon the release of the first device for moving the opening-and-closing mechanism in one direction and operative upon the release of the second device for moving the said mechanism in the other direction, the second said stop serving upon relative movement of the two parts of the gun to restore the cylinder and pistons to their initial relative positions.

12. In a recoil gun having a reciprocable part and a non-reciprocable part, the combination of a cylinder carried by the reciprocable part and containing fluid under pressure, two independent pistons in the cylinder, and means dependent on relative movements between the cylinder and the pistons under the influence of the fluid pressure for opening and closing the breech.

13. In a recoil gun having a reciprocable part and a non-reciprocable part, the combination of a cylinder carried by the reciprocable part and containing fluid under pressure, mechanism operable by the fluid pressure for opening and closing the breech, and independently releasable stops for preventing the movement of the said mechanism in the opening and closing directions respectively.

14. In a gun, the combination of a reciprocable member comprising a cylinder and containing a fixed quantity of fluid under pressure, the said member being entirely closed against the escape of the fluid, a piston in the cylinder, and breech moving mechanism operable by the reciprocation of the said cylinder.

15. In a gun, the combination of a reciprocable cylinder containing fluid under pressure, two independent pistons in the cylinder each adapted to be held stationary, and breech opening-and-closing mechanism operable by the reciprocation of the said cylinder.

16. In a gun, the combination of a reciprocable cylinder containing fluid under pressure, two independent differently diametered pistons in the cylinder, breech opening-and-closing mechanism, and means dependent on the movement of the cylinder relative to one piston for moving the mechanism in one direction and dependent on the movement of the cylinder relative to the other piston for moving the mechanism in the other direction.

17. In a gun, the combination of a reciprocable cylinder containing fluid under pressure, two independent pistons in the cylinder, breech opening-and-closing mechanism, and means dependent on the movement of the cylinder relative to both pistons for moving the mechanism in one direction and dependent on the movement of the cylinder and one piston relative to the other piston for moving the mechanism in the other direction.

18. In a gun, the combination of a reciprocable cylinder containing fluid under pressure, two independent differently diametered pistons in the cylinder, breech opening-and-closing mechanism, and means dependent on the movement of the cylinder relative to both pistons for moving the mechanism in one direction and dependent on the movement of the cylinder and the larger piston relative to the smaller piston for moving the mechanism in the other direction.

19. In a gun, the combination of a reciprocable cylinder containing fluid under pressure, two independent pistons projecting into the cylinder from opposite ends and each adapted to be held stationary, breech opening-and-closing mechanism operable by the said cylinder, and devices capable of holding the cylinder against movement but adapted to be released to permit the cylinder to move relatively to either piston under the influence of the fluid pressure.

20. In a gun, the combination of a reciprocable cylinder containing fluid under pressure, two independent pistons in the cylinder one stationary and one movable, breech opening-and-closing mechanism operable by the said cylinder, a releasable stop for holding the cylinder against movement relative to the stationary piston, and a releasable stop for holding the movable piston against movement.

21. In a recoil gun having a reciprocable part and a non-reciprocable part, the combination of a cylinder carried by and reciprocable relatively to the reciprocable part and containing fluid under pressure, a piston in the cylinder, mechanism dependent on relative movements between the cylinder and the piston under the influence of the fluid pressure for moving the breech block, a releasable stop on the non-reciprocable part for locking the said piston against movement, and means dependent upon relative movement of the two parts of the gun and operative while the breech moving mechanism is idle for restoring the cylinder and piston to their initial relative positions.

22. In a recoil gun, the combination of a fluid cylinder carried by and reciprocable relatively to the reciprocable part of the gun, fluid-controlled cylinder reciprocating means comprising a piston adapted to be fixed relatively to the non-reciprocable part of the gun, and breech moving means connected to and actuated by the cylinder.

23. In a recoil gun, the combination of a fluid cylinder carried by and reciprocable relatively to the reciprocable part of the gun, fluid-controlled cylinder reciprocating means comprising a piston fixedly secured to the said reciprocable part and a piston adapted to be fixed relatively to the non-reciprocable part of the gun, and breech opening-and-closing means connected to and actuated by the cylinder.

24. In a recoil gun, the combination of a cylinder carried by and reciprocable relatively to the reciprocable part of the gun and containing fluid under pressure, two independent pistons in the cylinder, breech opening-and-closing mechanism, and means dependent on the movement of the cylinder relative to one piston for moving the mechanism in one direction and dependent on the movement of the cylinder relative to the other piston for moving the mechanism in the other direction.

25. In a recoil gun, the combination of a cylinder carried by and reciprocable relatively to the reciprocable part of the gun and containing fluid under pressure, breech block moving mechanism operable by the said cylinder, and a releasable stop for holding the cylinder against movement.

26. In a recoil gun, the combination of a cylinder carried by and reciprocable relatively to the reciprocable part of the gun and containing fluid under pressure, breech opening-and-closing mechanism operable by the said cylinder, and independently releasable stops for respectively holding the cylinder against movement in the opening and closing directions.

27. In a recoil gun, the combination of a cylinder carried by and reciprocable relatively to the reciprocable part of the gun and containing fluid under pressure, breech opening-and-closing mechanism operable by the said cylinder, a releasable stop on the reciprocable part for holding the cylinder against movement in one direction, and a releasable stop on the non-reciprocable part for holding the cylinder against movement in the other direction.

28. In a recoil gun, the combination of a cylinder carried by and reciprocable relatively to the reciprocable part of the gun and containing fluid under pressure, a piston in the cylinder adapted to be fixed relatively to the non-reciprocable part of the gun, breech moving mechanism operable by the said cylinder, and means dependent on the relative movement of the two parts of the gun for restoring the cylinder to its initial position relative to the piston.

29. In a recoil gun, the combination of a cylinder carried by and reciprocable relatively to the reciprocable part of the gun and containing fluid under pressure, two independent pistons in the cylinder one fixed to the reciprocable part of the gun and the other movable, breech opening-and-closing mechanism operable by the said cylinder, and means dependent on the relative movement of the two parts of the gun for restoring the cylinder and the pistons to their initial relative positions.

30. In a recoil gun, the combination of a cylinder carried by and reciprocable relatively to the reciprocable part of the gun and containing fluid under pressure, a piston in the cylinder fixed to the reciprocating part of the gun, a second piston in the cylinder movable relatively to the said part, breech opening-and-closing mechanism operable by the said cylinder, and a releasable stop on the non-reciprocable part of the gun for engaging the second piston to restore it to its initial position in the cylinder upon the movement of the reciprocable part relative to the non-reciprocable part.

31. In a recoil gun, the combination of a cylinder carried by the reciprocable part of the gun and containing fluid under pressure, a piston in the cylinder, mechanism dependent on relative movement between the cylinder and the piston for moving the breech, a releasable stop for preventing relative movement between the cylinder and piston, and means dependent on the relative movement of the two parts of the gun for releasing the said stop.

In testimony whereof I have signed this specification in the presence of two subscribing witnesses.

EUGÈNE SCHNEIDER.

Witnesses:
R. DE SEVELINGER,
CHAS. P. PRESSLY.

Copies of this patent may be obtained for five cents each, by addressing the "Commissioner of Patents, Washington, D. C."